Aug. 29, 1933.  L. D. LOVEKIN  1,924,868
GAS SHUT-OFF FIRE VALVE DEVICE
Filed July 29, 1931    2 Sheets-Sheet 1
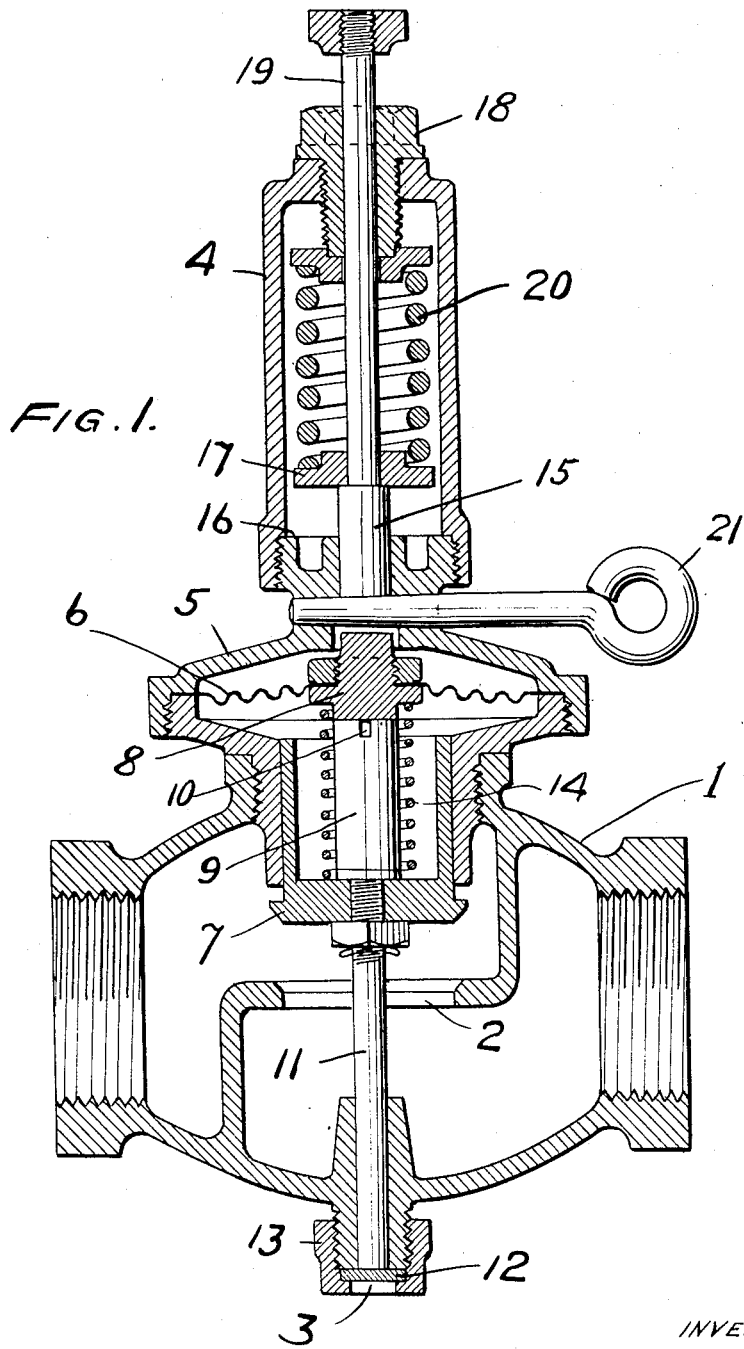
INVENTOR
*Luther D. Lovekin*
BY
*Augustus B. Stoughton*
ATTORNEY.
WITNESS:

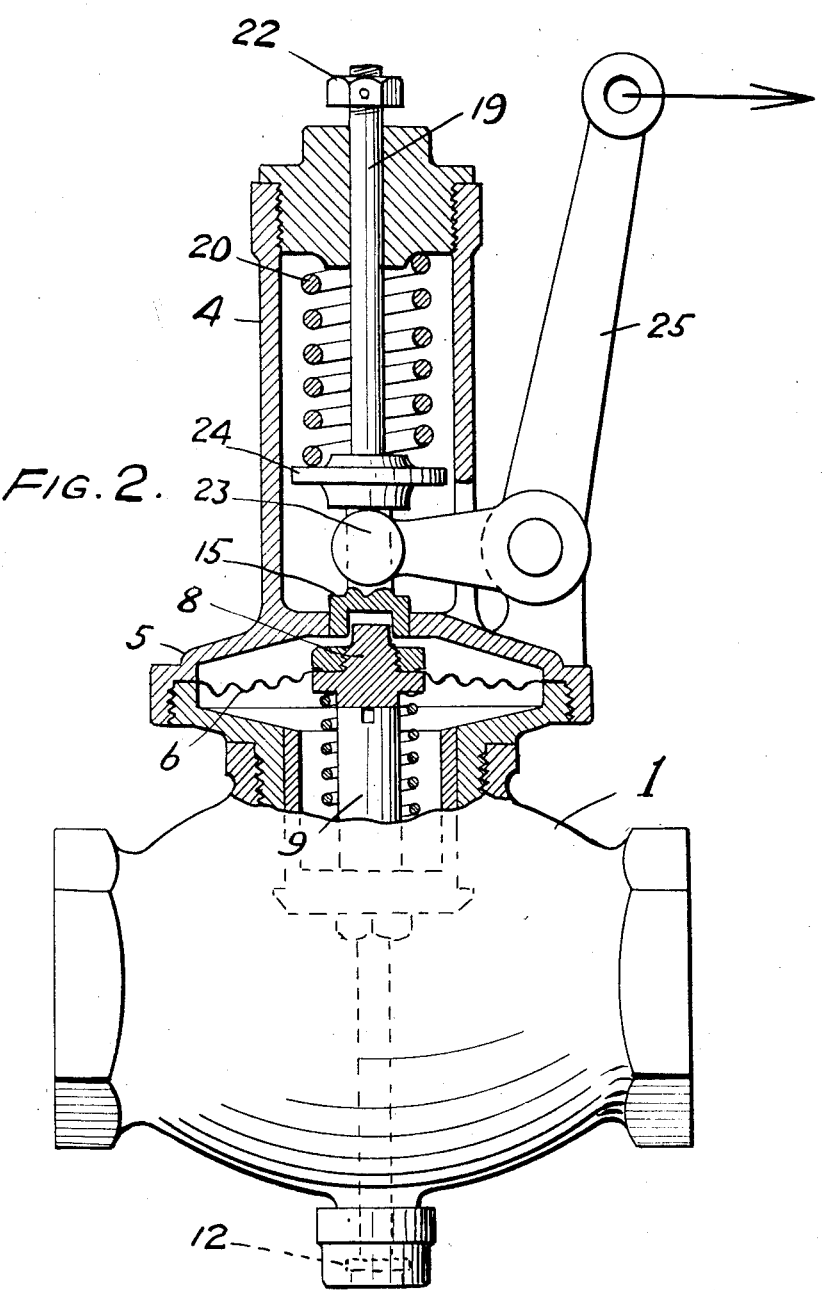

Patented Aug. 29, 1933

1,924,868

UNITED STATES PATENT OFFICE 1,924,868

GAS SHUT-OFF FIRE VALVE DEVICE

Luther D. Lovekin, Villanova, Pa., assignor to Kitson Company, Philadelphia, Pa., a corporation of West Virginia Application July 29, 1931. Serial No. 553,737

6 Claims. (Cl. 137—162)

One of the objects of the present invention is to make the valve casing tight against leakage of gas. Another object of the invention is to provide for the leakage of gas from the distribution system of a building or other construction when the device has shut off the supply of gas from the street main. Another object of the invention is to provide for the convenient and satisfactory operation or release for operation of the device from a distant point for the purpose of closing the gas valve. Another object of the invention is to provide a simple, reliable and efficient gas shut off fire valve device capable of operation upon exposure to increased temperature and also capable of operation from a point outside of the building in which it is arranged.

Generally stated, the invention comprises a device of the character mentioned including a body of fusible or puncturable metal, a valve tending to close to shut off the gas and held open by said body, and means operatable from a point outside of the valve device and of the building in which it is located and operated to puncture the body and permit the valve to close.

The invention also comprises means for puncturing the body referred to arranged on one side of the diaphragm and then permitting closing movement of a valve to a distance considerably greater than the distance which the diaphragm is caused to move, thus limiting the movement of the diaphragm to well within its capability of movement.

The invention also comprises the improvements to be presently described and finally claimed.

In the following description reference will be made to the accompanying drawings forming part hereof and in which Figure 1 is an elevation principally in central section showing a device embodying features of the invention, and Fig. 2 is a similar view illustrating a modification.

In the drawings 1 is a valve casing having a port 2 and an opening 3 to the atmosphere. 4 is a bonnet and 5 is a neck piece arranged between the casing and bonnet. 6 is a diaphragm, and it serves to make the casing 1 tight. 7 is a valve for closing the port 2, and it is shown as of the piston and cylinder guided type. There is a hub 8 on the diaphragm, and the hub 8 is not attached to the rod 9 connected with the valve but there is a parting between the hub 8 and the end of the rod 9, at which is shown a notch 10 useful for the reception of a tool used for grinding the valve to its seat. There is another rod 11 which may be a continuation of the rod 9 and it is adapted for projection through the hole 3. 12 is a fusible or puncturable body which serves to close the hole 3 and also to hold the valve 7 in open position. The detachable cap 13 is a means for holding the body 12 in place and for permitting of its renewal. The valve 7 tends to close, and this can be accomplished either by gravity or by the use of a comparatively light spring 14 reacting on the diaphragm hub 8. In the bonnet 4 there is arranged a spring pressed plunger 15, of which the inward movement is limited by the stop 16 and collar 17 attached to the plunger 15. The adjusting nut 18 and the rod 19 are not essential and they are only present where it is desired to adjust the tension of the spring 20. With a spring 20 of proper strength the parts 18 and 19 are omitted. 21 is a rod shown as tapering, and it is removably mounted in an opening provided in the neck 5. In the position shown it supports the plunger 15 in retracted position. It may be remarked that the spring 20 is strong or powerful in comparison with the spring 14 which is not of sufficient strength to puncture the body 12, whereas the spring 20 is of sufficient strength for that purpose.

In describing the mode of operation of the device, it will be assumed that it is arranged inside of a building on the street side of the meter and in such a way that gas passes through the valve casing from left to right in the drawing. There is a cord or other connection, not shown, which extends from the pin 21 to the outside of the building. In the event of fire in the building which does not soften the metal of the body 12, any one desiring to shut off the supply of gas from the main withdraws the pin 21 from the outside of the building. The withdrawal of the pin permits the spring pressed plunger 15 to strike a blow on the diaphragm hub 8, and this blow is transmitted through the rods 9 and 11, and serves to puncture the body 12 with the result that the valve 7 closes and shuts off the gas, then although the gas from the main is shut off, the gas in the distribution system of the building can leak past the rod 11 and through the hole in the body 12, thus freeing gas connections throughout the building from gas.

It may be remarked that the movement of the diaphragm is limited and is substantially equal to the thickness of the body 12, while the movement of the plunger 15 is comparatively greater and the movement of the valve 7 is comparatively still greater. This is a matter of considerable importance because it tends to make the use of a diaphragm practical and possible, it being well known that the proper movement of a diaphragm is limited.

The construction and mode of operation of the modification shown in Fig. 2 are as above described except as follows:

The stop for the plunger 15 is the nut 22, and the means for restraining the plunger is a claw 23, working under the spring support 24 which is fast to the plunger. The claw is connected with the pivotal lever 25, normally held under force exerted in the direction of the arrow and releasable from the outside of the building.

When the lever 25 is released the valve is closed in the manner described and if the release is a quick one a hammer blow is struck by the plunger on the hub of the diaphragm just as is the case in the construction shown in Fig. 1.

In all cases if the body 12 of fusible metal is softened by rise in temperature due to fire, it is punctured by the rod 11 permitting the valve to close.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A gas shut-off fire valve device comprising a diaphragm, a valve tending to close to shut off the gas and arranged on one face of said diaphragm and unattached thereto, a body of puncturable metal for holding said valve open and up against the diaphragm, a spring plunger on the other side of the diaphragm, and means for setting and releasing the spring plunger to permit it, when released and acting through the valve, with comparatively little motion of the diaphragm, to puncture the body, thereby causing the valve to complete its closing stroke while the diaphragm remains at rest.

2. A gas shut-off fire valve device comprising a diaphragm, a self closing valve arranged on one side of and disconnected from the diaphragm, a body of puncturable metal arranged to hold the valve in open position, and means arranged on the other side of the diaphragm and adapted for initiating a limited movement of the diaphragm and valve sufficient to puncture said body and thereby permit the valve to complete its closing stroke independent of the diaphragm.

3. A gas shut-off fire valve device comprising a diaphragm, a self closing valve arranged on one side of and disconnected from the diaphragm, a body of puncturable metal arranged to hold the valve open and up against the diaphragm, a spring pressed means on the other side of the diaphragm and having a limited stroke, and means for restraining the spring pressed means and for releasing the spring pressed means to permit it to strike a hammer blow on the valve to puncture the body and thereby permit the valve to close independently of the diaphragm.

4. A gas shut-off fire valve device comprising a casing having a ported gasway and a bonnet, a diaphragm interposed between the casing and bonnet, a valve disconnected from the diaphragm and tending to close the port of the gasway, a rod connected with the valve and adapted for projection through a hole provided in the casing, a puncturable body normally closing said hole and supporting said rod with the valve in open position, a spring pressed plunger arranged in the bonnet for a limited range of motion in respect to the diaphragm, and means for holding the plunger in retracted position and for releasing it to drive the rod through the body establishing leakage connection through the punctured body and permitting the valve to close independent of the diaphragm.

5. A gas shut-off valve device comprising a valve casing having a port and a bonnet and a neck connecting the casing and bonnet, a diaphragm adapted to close the valve casing and having a hub, a self-closing valve in the casing provided upon each face with a rod, one rod extending into proximity with and disconnected from the hub of the diaphragm, and the other rod projectible through a hole in the casing, a puncturable body mounted on the wall of the casing and arranged to support the valve in open position, a plunger in the body having a limited range of movement, means for projecting the plunger to strike the hub of the diaphragm, and means for releasing the plunger.

6. A gas shut-off valve device comprising a puncturable body, a valve tending to close to shut off the gas and held open by said body, a diaphragm detached from the valve, and means for moving the valve and diaphragm sufficiently to puncture the body and thereafter permit the valve to close independently of the diaphragm.

LUTHER D. LOVEKIN.